Sept. 4, 1951  J. F. STOLTZ  2,567,086
APPARATUS FOR SYNCHRONIZING FILM WITH SOUND TAPE
Filed March 11, 1948
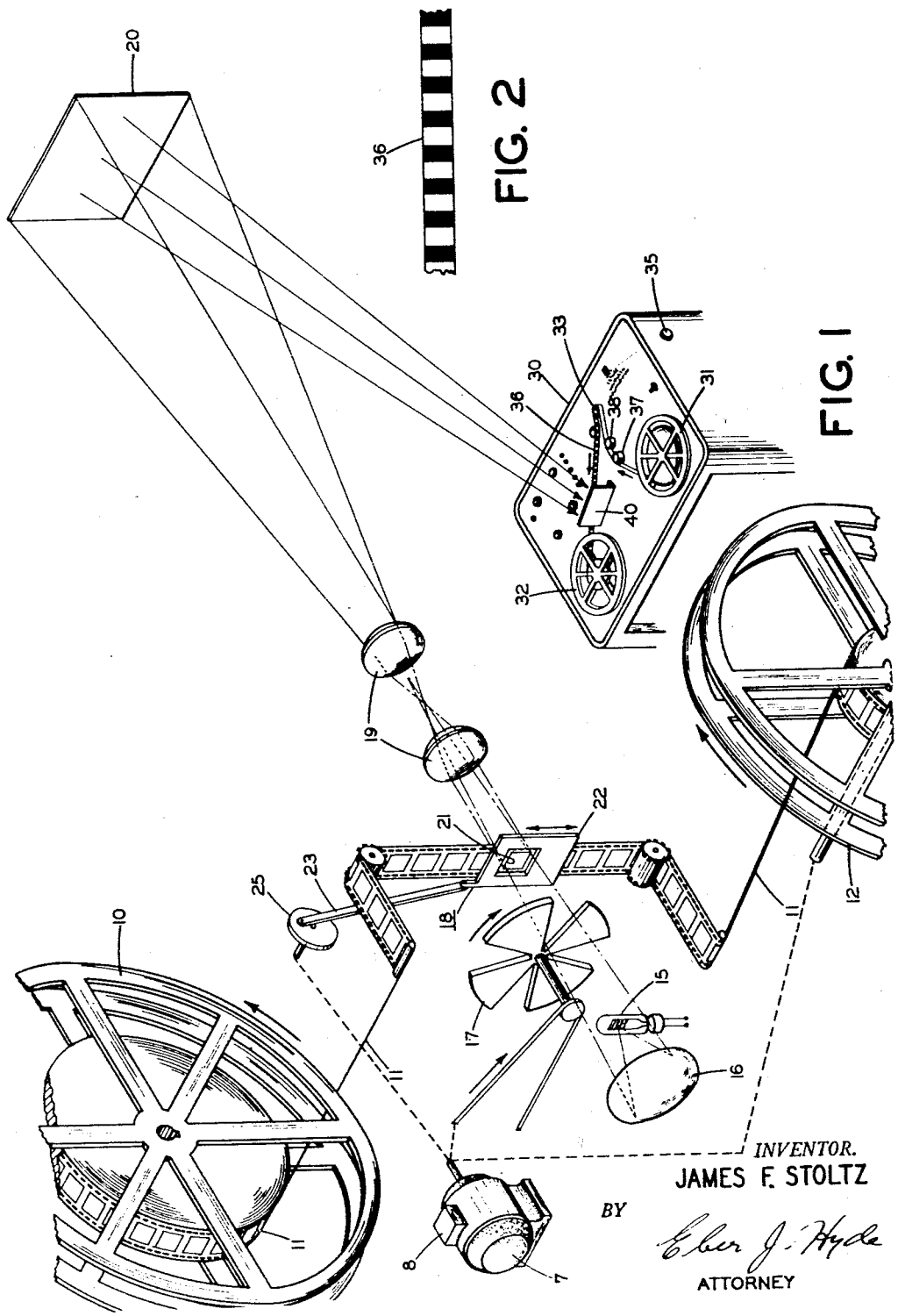
INVENTOR.
JAMES F. STOLTZ
BY
*Eber J. Hyde*
ATTORNEY Patented Sept. 4, 1951

2,567,086

UNITED STATES PATENT OFFICE 2,567,086

APPARATUS FOR SYNCHRONIZING FILM WITH SOUND TAPE

James F. Stoltz, La Grange, Ill., assignor to The Brush Development Company, Cleveland, Ohio, a corporation of Ohio Application March 11, 1948, Serial No. 14,316

4 Claims. (Cl. 88—16.2)

1

This invention relates to a method of and means for synchronizing the linear speed of a strip of motion-picture film with the linear speed of a length of sound-transducer tape. This method is particularly adaptable for synchronizing film and tape motions in an arrangement where the film-drive mechanism is not connected to the tape-drive mechanism.

In the past, numerous attempts have been made to accomplish synchronization between the motion of the film in home movie projectors and the motion of the sound record in various types of sound equipment. Complete success has not been obtained due to speed variations in the several pieces of equipment involved and due to the accuracy required to prevent accumulative error throughout the length of a long motion picture. Stroboscopes have been used to maintain constant projector speed and voltage controls have been provided to maintain constant speed of the sound equipment, but in spite of these it is not unusual at the end of a half-hour showing to find the two mediums 10 to 15 seconds out of synchronism. The results of such unsynchronization spoils both the film and the sound effects. An added difficulty arises when trying to synchronize film with the newly perfected paper tape magnetic recorder-reproducer devices as the paper is apt to expand and contract lengthwise with changes in humidity. Plastic tapes are also subject to changes in length.

An object of the invention is to provide an inexpensive, easily operable, reliable method of and means for synchronizing the motion of motion-picture film with the motion of a tape in a sound recording and/or reproducing device.

A further object of the invention is to provide a method of and means for synchronizing a film-drive mechanism with a sound-tape drive mechanism under conditions where there are no mechanical or electrical connections between the two mechanisms.

Still another object of the invention is to provide a method of and means for synchronizing a portable home movie projector with a portable tape recorder.

It is also an object of the invention to provide a method of and means for synchronizing a home movie projector with a sound-on-tape recorder which is so simple that anyone capable of operating a movie projector or a tape recorder will be able to perform the method after reading simple printed instructions.

Another object of the invention is to provide a method of and means for synchronizing a

2 movie projector with a sound recorder using a tape which may stretch due to use or due to humidity conditions.

In accordance with an embodiment of the invention, the method of synchronizing the film-drive mechanism of moving picture apparatus having a light interrupting shutter with the tape drive mechanism of a magnetic sound recorder which includes portions movable at a substantially constant speed throughout the time for the transduction of sound, wherein one of the portions includes visible indicia, comprises: illuminating the indicia with light interrupted by the shutter of the apparatus while recording sound on the tape, controlling the film-to-tape speed until, through the stroboscopic effect of the flickering light on the indicia, the indicia appear in a definite relationship; reproducing the recording while illuminating the indicia with flickering light from the projector of the apparatus, and controlling the film-to-tape speed until, through the stroboscopic effect of the flickering light on the indicia, the indicia appear to have the said definite relationship.

In accordance with another embodiment, the invention comprises, in combination, a moving picture projector including film and having a light interrupting shutter for interrupting the light from the projector to establish a given flicker frequency for the projector; means for moving the film in synchronism with the shutter; a magnetic tape sound reproducer including portions movable at a substantially constant speed throughout the time for the reproduction of sound from the magnetizable tape, and one of those portions includes visible discontinuous indicia the spacing of which bears a known relation to the projector flicker frequency; means for moving the tape; and means for synchronizing the tape speed with the film speed comprising means for varying the film-to-tape speed until the indicia, when viewed in the flickering light from the projector, appear to stand still.

For a better understanding of the present invention, together with other and further objects thereof, reference is had to the following description taken in connection with the accompanying drawings, and its scope will be pointed out in the appended claims.

In the single sheet of drawings, Fig. 1 is an isometric, partially broken-away view of apparatus for performing the method of the invention; and Fig. 2 is a view of a fragmentary piece of sound-recorder tape for use in the apparatus of Fig. 1.

In Fig. 1 there are shown certain elements of a moving picture apparatus, as for example a projector for home use, necessary for a clear understanding of the invention. All of the details of the projector have not been shown as they are not necessary to an understanding of the subject matter of the invention.

The moving picture projector comprises a supply reel 10 upon which is wound a length of film 11 and a take-up reel 12 onto which the film 11 is wound after it passes through a projector. A motor 7 having a speed control 8 is provided for driving the reel 12 during the showing of a picture, and for driving the reel 11 during the film rewind operation, as is known to the art.

The projector comprises a light source 15, a mirror 16 for reflecting light from the source 15 through an interrupting mechanism such as the shutter 17, through an opening 21 in the sliding window 22 of an intermittent film-drive device 18, and through the lens system 19 to a remotely positioned screen 20.

The light interrupter 17 is driven at a steady rate by the motor 7 in synchronism with the reel 12. The motor 7 is also utilized to drive the cam 25 of the intermittent film-drive device 18 and the cam drives the window 22 through the arm 23. Thus the motions of the reels 12, 11, the shutter 17 and the intermittent film drive device 18 are in synchronism. As the window 22 is driven downwardly, it grips the film 11 and advances the next frame to a position where light from source 15 is projected through it to cast an image on the screen 20. It is usual in most home movie projectors for sixteen frames to be presented per second, and the shutter mechanism 17 is usually operated at such a rate that the light is interrupted two, three or four times during the time interval between successive frames being placed in position for projection. This produces light on the screen 20 which flickers at a rate of 32, 48, or 64 times per second. This is known as the "flicker frequency" of the projector.

A sound recorder-reproducer 30 of the type which utilizes a tape is provided. This recorder-reproducer 30 may comprise a supply reel 31, a take-up reel 32, a recording head 37, a reproducing head 38 and a drive capstan 33 which is driven by a motor, not shown, mounted within the cabinet. The speed of the motor is controllable by a speed control knob 35 mounted on the cabinet. A length of tape 36 extends from the supply reel 31 to the take-up reel 32, passing around the drive capstan 33 and over the heads 37, 38 in its path. The rate of motion of the tape 36 may be varied by turning the knob 35.

A preferred type of recorder-reproducer utilizes a length of magnetizable tape and the sound is recorded on, and reproduced from, the record member magnetically, as is known to the art. The tape 36 may be paper, plastic or other suitable material having a thin coating of magnetizable material on one of its faces. This magnetically coated face, or front face, engages the recording and reproducing heads 37, 38 as the tape 36 is driven from the supply reel 31 to the take-up reel 32 by a motor within the cabinet.

In accordance with this invention the tape includes a visible indicia on one of its faces. Preferably this indicia is in the form of a series of regularly spaced light and dark stripes extending transversely to the length of the tape. The stripes may be printed on the tape and it is preferable to apply them to the back face thereof so that they do not cover up part of the magnetizable material on the front face and thus interfere with the operation of the recorder-reproducer.

In performing the method of this invention, the sound record tape 36 is illuminated with flickering light from the motion picture apparatus while sound is being recorded on it and the speed of the tape 36 is controlled by turning the speed control knob 35 or by varying the speed of the film drive motor 7 until, through the stroboscopic effect of the flickering light on the tape, the indicia appear to have a definite relationship. A convenient relationship is one wherein the indicia appear to stand still. Then during the reproduction of the sound from the tape, the indicia are illuminated with flickering light from the projector of the apparatus and the film-to-tape speed is controlled until the indicia appear to stand still. The sound on the tape is then in synchronization with the pictures on the film and, so long as the indicia do not drift to one side or the other, the synchronization will be maintained.

A convenient way to illuminate the indicia on the back face of the tape 36 with flickering light from the projector is to mount a mirror 40 on the top panel of the sound recorder-reproducer 30 in such a position that it picks up light from the screen 20 and reflects it onto the back face of the tape 36.

It is not essential that the tape be illuminated with flickering light and its speed controlled while sound is being recorded thereon. It is within the scope of this invention to utilize any speed control system while recording sound on the tape that will establish a fixed ratio between the tape speed and the film speed in order to achieve synchronization during reproduction and to thereafter use the projector flicker frequency and the stroboscopic effect to achieve the fixed ratio during the reproduction. For example, an 8 mm. projector operating at 16 frames per second will show 50 feet of film in about 4.25 minutes. In 4.25 minutes a magnetic tape recorder-reproducer having a tape which moves at a rate of 7.5 inches per second will use 159.4 feet of tape. A musical score or a sound sequence describing the contents of the 50 feet of film can be recorded on 159.4 feet of tape utilizing any means for assuring that the score or sound sequence substantially evenly fills the 159.4 feet of tape. The exposed film and the recorded tape may be produced commercially and sold. In order for the purchaser to be able to synchronize the film and tape speeds there must be a correlation between the flicker frequency of the projector and the frequency at which the stripes on the sound tape pass a given point on the reproducer. This may be a 1:1 correlation and, for the above example if the flicker frequency of the projector were 48 per second would mean that there would have to be 48 stripes in the length of tape which would pass the given point per second, or 48 stripes in 7.5 inches of tape. It would also be possible to use a tape having 24 stripes per 7.5 inches, or one having 16 stripes per 7.5 inches. In other words, with a projector having a given flicker frequency, a sound tape can be synchronized with its film if the stripes on that portion of the tape which passes a given point in one second are equal to the projector flicker frequency or a whole sub-multiple thereof.

The preferred embodiment of the invention has the stripes applied to the back face of the tape. However, it is within the scope of the invention to apply the stripes to any part of the tape drive mechanism 30 which moves at a constant speed throughout the recording or reproducing of the record from the tape 36. As an example, the stripes can be applied to the top surface of the drive capstan 33.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In combination: a moving picture projector including film and having a light interrupting shutter for interrupting the light from the projector to establish a given flicker frequency for said projector; means for moving said film in synchronism with said shutter; a sound reproducer including a magnetic tape including visible regularly discontinuous indicia the spacing of which bears a selected unitary relation to the said flicker frequency; means for moving said tape at a substantially constant linear speed throughout the time period for transducing the entire record on said tape; and means for adjusting the constant linear speed until the indicia, when viewed in the flickering light from said projector, appear to stand still.

2. In combination: a motion picture projector having an intermittent film drive mechanism; a magnetic sound reproducer comprising an elongated record medium, a transducer head, and a record medium drive mechanism including a capstan portion moving at a constant angular velocity in engagement with said record medium for driving said record medium past said transducer head at constant linear velocity throughout the time period for transducing the entire record on said record member; visible regularly discontinuous stroboscopic indicia means the spacing of which bears a selected unitary relation to the flicker frequency of said film connected to said portion of said magnetic sound reproducer which moves with constant velocity and expose to flickering light from said motion picture projector; and speed control means for adjusting the velocity of the film and the record medium with respect to each other until, through the stroboscopic effect, the indicia means appears to stand still.

3. The combination as set forth in claim 2, further characterized by reflector means mounted on said reproducer in proximity to said record medium for reflecting flickering light from said projector onto the said indicia.

4. Synchronizing means for synchronizing the motion of the record medium of a magnetic sound reproducer with the motion of the film of a motion picture projector having an intermittent film drive mechanism, comprising, a record medium drive mechanism including a capstan portion moving at a constant angular velocity in engagement with said record medium for driving said record medium past a reproducing head at a constant linear velocity throughout the time period for tranducing the entire record on said record member; visible regularly discontinuous stroboscopic indicia means the spacing of which bears a selected unitary relation to the flicker frequency of said film on a portion of said magnetic sound reproducer which moves with constant velocity for exposure to flickering light from said motion picture projector; and speed control means for adjusting the velocity of the film and the record medium with respect to each other until, through the stroboscopic effect, the indicia means appear to stand still.

JAMES F. STOLTZ.

REFERENCES CITED

The following references are of record in the file of this patent:

UNITED STATES PATENTS

| Number | Name | Date |
|---|---|---|
| 1,641,136 | Dorn | Aug. 30, 1927 |
| 1,812,348 | La Rue | June 30, 1931 |
| 1,836,691 | Tuttle | Dec. 15, 1931 |
| 2,407,996 | Nies | Sept. 24, 1946 |

OTHER REFERENCES

American Cinematographer, September 1945, pages 300, 312, 313 and 320 cited. (Copy in Division 7 in (88–14) 121.)